Patented Dec. 1, 1936

2,062,614

UNITED STATES PATENT OFFICE 2,062,614

BENZOPHENANTHRENARYLIDES

Albert Schmelzer, Cologne-Mulheim, and Curt Schuster, Ludwigshafen-on-the-Rhine, Germany, assignors to General Aniline Works, Inc., New York, N. Y., a corporation of Delaware No Drawing. Application August 23, 1935, Serial No. 37,600. In Germany December 24, 1934

4 Claims. (Cl. 260—124)

The present invention relates to intermediate products suitable for the manufacture of water-insoluble azodyestuffs, more particularly it relates to compounds of the probable general formula:—

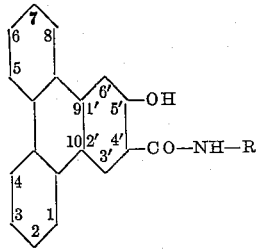

wherein R stands for an aromatic radical free from groups inducing solubility in water, such as a benzene, naphthalene, anthracene or carbazole nucleus which may be substituted, for example by alkyl, alkoxy, halogen, the nitro group and the like.

Our new compounds are obtainable by starting with the 5'-hydroxybenzo-1',2'-9,10-phenanthrene-4'-carboxylic acid and condensing the same with the corresponding primary aromatic amines according to the known methods of preparing 2,3-hydroxynaphthoic acid arylamides. For example, our new arylamines are obtainable by heating the carboxylic acid chloride or an ester of the carboxylic acid with the corresponding amine in a suitable organic solvent, such as nitrobenzene, and with the addition of an acid-binding or water-binding agent respectively; favorably the carboxylic acid chloride is simultaneously prepared in the condensation process by starting with the free carboxylic acid and dropping in phosphorus oxychloride or phosphorus trichloride.

Our new products generally are white to yellow colored compounds, which are soluble in alkalies with a greenish yellow coloration. It is astonishing that the compounds obtained in accordance with the present process exhibit a sufficient solubility in dilute lyes for commercial purposes, in spite of the high molecular weight of at least more than 360, and a high affinity for the fibre. The new arylamides are intended to find application as intermediate products for the manufacture of dyestuffs.

The starting 5'-hydroxybenzo-1',2'-9,10-phenanthrene-4'-carboxylic acid can be prepared as follows:—

Benzo-1',2'-9,10-phenanthrene is sulfonated to the corresponding 5'-sulfonic acid by treating with a sulfonating agent in the presence of a solvent or diluent, such as nitrobenzene, the 5'-sulfonic acid group is substituted by a hydroxy group by melting with a caustic alkali, and the 5'-hydroxybenzo-1',2'-9,10-phenanthrene is then transformed into the corresponding 4'-carboxylic acid by treating with carbon dioxide at superatmospheric pressure and elevated temperature in the presence of an alkali, such as soda or potash.

The invention is illustrated by the following examples, but is not restricted thereto:—

(1) 18 parts by weight of 5'-hydroxybenzo-1',2'-9,10-phenanthrene-4'-carboxylic acid together with 7.7 parts by weight of o-toluidine and 400 parts by weight of toluene are heated to 60–70° C. and with thorough stirring 4.5 parts by weight of phosphorus trichloride are added drop by drop. After about 8 hours' heating to boiling the evolution of hydrochloric acid has ceased, and the arylide obtained is dissolved in toluene with the exception of a small quantity of a resinous residue. The solution is poured off from the residue, rendered alkaline with soda solution, and the solvent is distilled off with steam. The o-toluidide separated of the formula:—

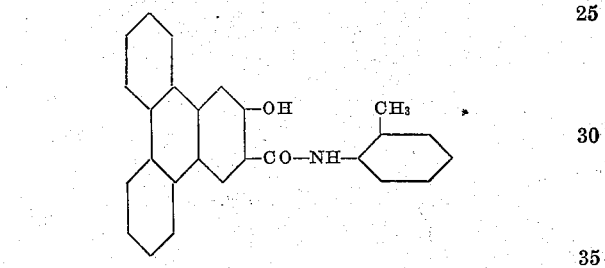

is filtered with suction while hot and dissolved in water with the addition of sodium hydroxide. If necessary the solution is filtered. Then it is acidified with hydrochloric acid and the toluidide is filtered with suction, washed with water until the reaction is neutral, and then dried. After recrystallizing from a little methyl alcohol it has the melting point of 235–236° C.

The working up of the reaction solution may also be effected by cooling the solution in toluene after removal of the resinous residue, then filtering with suction the crystallized o-toluidide, washing with some toluene or ligroin and drying.

In an analogous manner there has been obtained the:— m-Toluidide, after recrystallization from trichlorobenzene-ligroin, obtained as faintly yellow colored fine crystals, of the melting point 235–237° C.;

p-Toluidide, after recrystallization from chlorobenzene, obtained as faintly yellow colored leaflets of the melting point 307-308° C.;

o-Anisidide, after recrystallization from chlorobenzene, obtained as light yellow fine crystals of the melting point 236-237° C.;

p-Anisidide of the melting point 272-273° C.;

p-Chloroanilide, after recrystallization from trichlorobenzene obtained as greenish-yellow fine crystals of the melting point 308-309° C.;

Anilide, after recrystallization from chlorobenzene-ligroine, obtained as light yellow needles of the melting point 269-270° C.;

β-naphthylamide of the melting point 258-259° C.;

(2) 28.8 parts by weight of 5'-hydroxybenzo-1',2'-9,10-phenanthrene-4'-carboxylic acid together with 17.5 parts by weight of aminohydroquinone dimethyl ether and 480 parts by weight of dimethyl aniline are heated to 60-70° C., and with stirring 7 parts by weight of phosphorus trichloride are added drop by drop. Then for 5-6 hours the interior temperature is kept at 105-110° C. The whole is subsequently rendered alkaline with soda solution and the dimethyl aniline distilled off with steam. The 5'-hydroxybenzo-1',2'-9,10-phenanthrene-4'-carboxylic acid -2'',5''-dimethoxyanilide of the formula:—

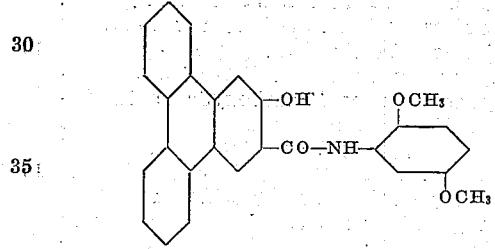

is filtered with suction, washed with water until the reaction is neutral and purified according to the directions of Example 1. From xylene the arylide crystallizes in yellowish brown crystals of the melting point 232-234° C.

We claim:

1. Hydroxybenzophenanthrene carboxylic acid arylamides of the general formula:—

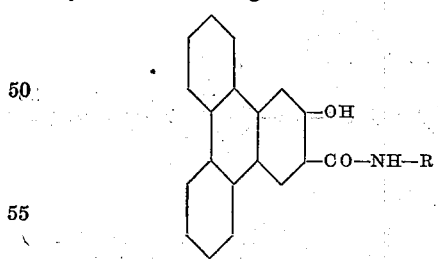

wherein R stands for an aromatic radical free from groups inducing solubility in water, being generally white to yellow colored substances, insoluble in water, soluble in aqueous alkalies and being valuable intermediate products for the manufacture of water-insoluble azodyestuffs.

2. Hydroxybenzophenanthrene carboxylic acid arylamides of the general formula:—

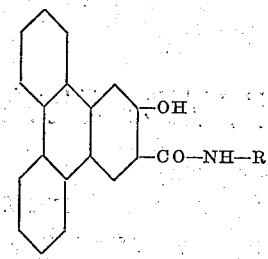

wherein R stands for a radical of the benzene series, free from groups inducing solubility in water, being generally white to yellow colored substances, insoluble in water, soluble in aqueous alkalies and being valuable intermediate products for the manufacture of water-insoluble azodyestuffs.

3. Hydroxybenzophenanthrene carboxylic acid arylamides of the general formula:—

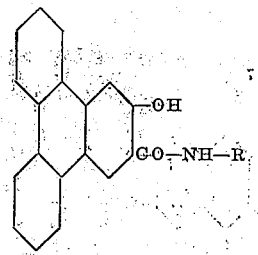

wherein R stands for a member selected from the group consisting of: phenyl and alkyl-alkoxy- and halogen-substituted phenyl being generally white to yellow colored substances, insoluble in water, soluble in aqueous alkalies and being valuable intermediate products for the manufacture of water-insoluble azodyestuffs.

4. The 5'-hydroxybenzo-1',2'-9,10-phenanthrene-4'-carboxylic acid o-toluidide of the formula:—

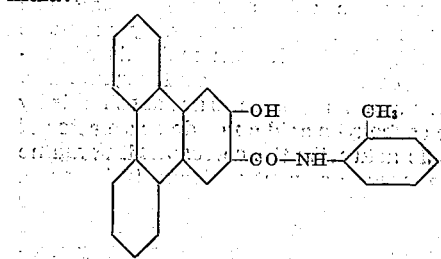

being a crystallizing substance of the melting point 235-236° C., insoluble in water, soluble in aqueous alkalies and being a valuable intermediate product for the manufacture of water-insoluble azodyestuffs.

ALBERT SCHMELZER.
CURT SCHUSTER.